US012173406B2

(12) United States Patent
Cavarroc et al.

(10) Patent No.: US 12,173,406 B2
(45) Date of Patent: Dec. 24, 2024

(54) DEVICE AND METHOD FOR DEPOSITING THICK METAL NITRIDE COATINGS BY THE SUPERCRITICAL FLUID ROUTE

(71) Applicants: SAFRAN, Paris (FR); CENTRE NATIONAL DE LA RECHERCHE SCIENTIFIQUE, Paris (FR); UNIVERSITE DE BORDEAUX, Bordeaux (FR)

(72) Inventors: Marjorie Christine Cavarroc, Moissy-Cramayel (FR); Cyril Aymonier, Begles (FR); Baptiste Simon Giroire, Bordeaux (FR); Bertrand Guillaume, Paris (FR); Angélique Nadine Jeanne Poulon, Arsac (FR); Guillaume Aubert, Talence (FR)

(73) Assignees: SAFRAN, Paris (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 69 days.

(21) Appl. No.: 18/006,840

(22) PCT Filed: Jul. 21, 2021

(86) PCT No.: PCT/FR2021/051364
§ 371 (c)(1),
(2) Date: Jan. 25, 2023

(87) PCT Pub. No.: WO2022/023647
PCT Pub. Date: Feb. 3, 2022

(65) Prior Publication Data
US 2023/0304159 A1    Sep. 28, 2023

(30) Foreign Application Priority Data

Jul. 30, 2020 (FR) ............................ 2008073

(51) Int. Cl.
*C23C 18/12* (2006.01)
(52) U.S. Cl.
CPC .............................. *C23C 18/1204* (2013.01)
(58) Field of Classification Search
CPC .................................................. C23C 18/1204
See application file for complete search history.

(56) References Cited

U.S. PATENT DOCUMENTS

2010/0143608 A1* 6/2010 Ruiz .................. C23C 18/1287
977/773

FOREIGN PATENT DOCUMENTS

CN     106086961 B    11/2017
FR     2 915 753 A1    11/2008
(Continued)

OTHER PUBLICATIONS

International Search Report as issued in International Patent Application No. PCT/FR2021/051364, dated Oct. 19, 2021.

*Primary Examiner* — Nathan T Leong
(74) *Attorney, Agent, or Firm* — Pillsbury Winthrop Shaw Pittman LLP

(57) ABSTRACT

A device for depositing a thick metal nitride on a sample by supercritical fluids includes a first enclosure forming a first closed volume; a second enclosure placed in the first enclosure and delimited by internal walls transparent to electromagnetic radiation forming a second closed volume intended to include fluid under supercritical conditions; a heat transfer dielectric fluid circulating in the first volume around the second enclosure; a sample holder present in the second volume; an induction heating device surrounding the second enclosure; inlets for introducing a fluid and at least
(Continued)

one precursor material into the second enclosure, and an outlet to purge the second volume.

11 Claims, 2 Drawing Sheets

(56) References Cited

FOREIGN PATENT DOCUMENTS

| WO | WO 2005/013331 A2 | 2/2005 |
|---|---|---|
| WO | WO 2005/069955 A2 | 8/2005 |

* cited by examiner

[Fig. 1]
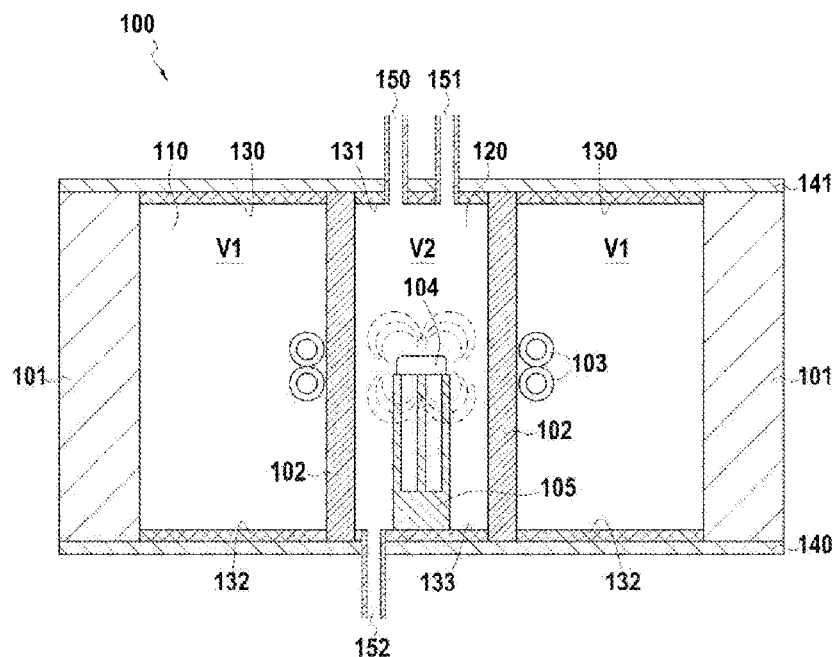
[Fig. 2]
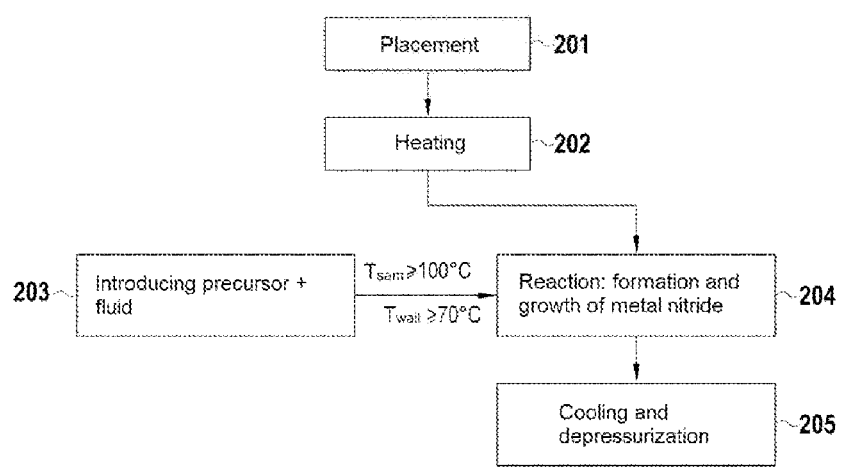

[Fig. 3]
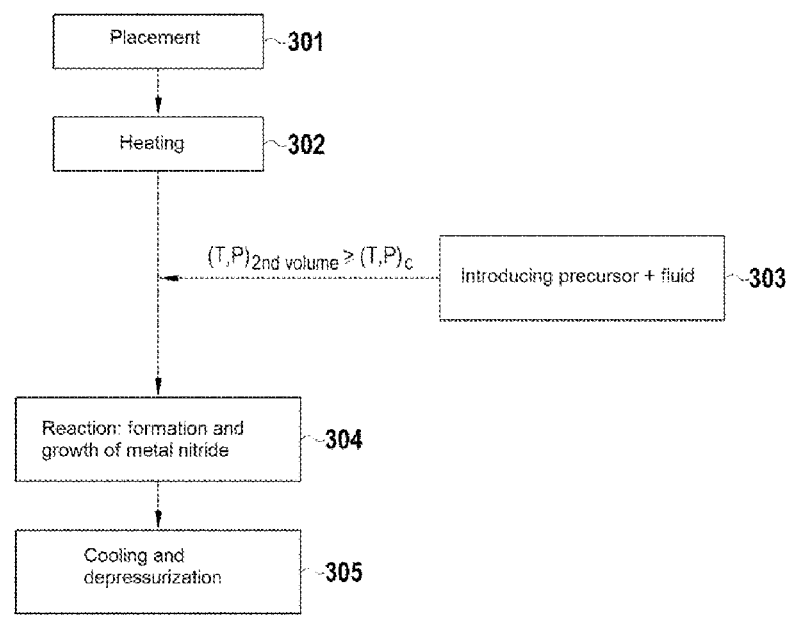

DEVICE AND METHOD FOR DEPOSITING THICK METAL NITRIDE COATINGS BY THE SUPERCRITICAL FLUID ROUTE

CROSS-REFERENCE TO RELATED APPLICATIONS

This application is the U.S. National Stage of PCT/FR2021/051364, filed Jul. 21, 2021, which in turn claims priority to French patent application number 20 08073 filed Jul. 30, 2020. The content of these applications are incorporated herein by reference in their entireties.

TECHNICAL FIELD

The present invention relates to the general field of coatings of metal nitrides and more particularly to thick coatings (greater than 1 µm) of metal nitrides, and even more particularly it relates to a device and a method for the thick deposition of coatings of metal nitrides by supercritical fluids.

PRIOR ART

Currently, coatings based on hard chromium produced by chemical and electrolytic syntheses with the formation of chromium IV are acclaimed by industrialists, because they are simple to produce, inexpensive and allow to cover numerous applications. They are nevertheless destined to disappear due to new regulations concerning the protection of human health and the environment.

In order to replace these coatings and/or manufacturing method, coatings based on tungsten carbide, steel or cermets produced by the plasma torch technique have been proposed. Nevertheless, they do not allow to produce thick coatings, in particular because of the formation of cracks and the degradation of the tribological properties of the coating.

Techniques of autocatalytic nickel plating or electrolytic nickel deposition have also been proposed, but they are expensive and the coatings obtained have little resistance to corrosion and/or degrade over temperature. Vapor phase deposition techniques are also not suitable, because they do not allow to produce thick coatings and nor to coat parts with complex geometry, that is to say non-planar. In addition, the necessary precursors are often dangerous and require that the material on which the coating is deposited withstands temperatures above 700° C.

It is therefore desirable to have a device and a method for depositing a coating of metal nitrides with a thickness greater than 1 µm in order to coat parts of complex geometry and to obtain a coating having good mechanical, chemical and tribological properties that can withstand thermal aging, the deposition method also having to be of little harm to the operator and the environment.

DISCLOSURE OF THE INVENTION

The invention relates to a device for depositing a metal nitride with a thickness greater than or equal to 1 µm on a sample by supercritical fluids comprising:
  a first enclosure delimited by external walls forming a first closed volume;
  a second enclosure delimited by internal walls forming a second closed volume, the second enclosure being placed in the first enclosure and being intended to contain a fluid under supercritical conditions and the material of the internal walls being transparent to electromagnetic radiation;
  a heat transfer dielectric fluid circulating in the first volume around the second enclosure;
  a sample holder present in the second volume and configured to support the sample;
  an induction heating device placed in the first enclosure and surrounding the second enclosure so as to be able to heat the sample placed on the sample holder;
  an inlet configured to introduce a fluid into the second volume;
  an inlet configured to introduce at least one precursor material into the second volume; and
  at least one outlet configured to purge the second volume.

In the invention, a fluid in supercritical conditions is a supercritical fluid, that is to say a fluid under pressure and at temperature under supercritical conditions.

The device of the invention allows to form a thick coating (greater than 1 µm) of metal nitride on flat samples or on samples with complex geometry while reducing the mechanical stresses partly responsible for the phenomena of delamination. In addition, metal nitride, such as titanium nitride TiN and tantalum nitride TaN, can replace hard chrome and is therefore more suitable for different aeronautical applications, such as engine or landing gear applications.

The induction heating device allows to heat only the sample while keeping a temperature on the internal and external walls lower than the temperature of the sample. Indeed, the fact of having internal walls transparent to electromagnetic radiation allows to avoid inductive couplings with these walls and to keep them at a colder temperature than that of the sample in order to control convection movements within the second enclosure. Thus, the formation of metal nitride on the internal walls of the device is avoided, which saves reagents such as precursor materials for example.

Induction heating also allows to have a better yield than resistive heating because it also allows to heat the entire surface of samples with complex geometry, in a faster and more homogeneous way or else by limiting the highest heating to a thickness close to the extreme surface of the part.

The fluid in supercritical conditions, called supercritical fluid, which will be present in the second volume, when the pressure and temperature conditions are met, will promote convection within the second enclosure to obtain heterogeneous germination, formation kinetics and growth of the metal nitride deposition on the surface of the sample which are significant and controllable by the amount of reagents provided.

According to a particular feature of the invention, the material of the internal walls is a ceramic. The majority of ceramics are transparent to electromagnetic radiation, therefore ceramics are excellent candidates for forming internal walls.

According to another particular feature of the invention, the first and second enclosures are closed by two covers made of 316L stainless steel.

Another object of the invention is a method for depositing a metal nitride with a thickness greater than or equal to 1 µm on a sample by supercritical fluids implemented by the device of the invention and comprising at least the following steps:
  placing the sample on the sample holder;

heating the sample by induction and heating the second volume by the dielectric heat transfer fluid;

introducing each precursor material and a fluid into the second volume so as to cause the precursor materials and the fluid to react under supercritical conditions to form metal nitride on a surface of the sample and to grow the metal nitride formed on the surface of the sample; and cooling then depressurizing the second volume.

The method of the invention implemented with the device of the invention allows to produce thick depositions (greater than 1 μm) of metal nitrides on a sample which may have a complex geometry, that is to say non-planar.

According to one embodiment of the invention, each precursor material and the fluid are introduced into the second volume when a temperature of the sample is greater than or equal to 100° C. and a temperature of the internal walls is greater than or equal to 70° C. throughout the duration of metal nitride formation and growth on the surface of the sample.

This allows to carry out a deposition in semi-continuous or continuous mode, that is to say that the deposition increases as the addition and reaction of the precursor materials and the fluid under supercritical conditions in the second enclosure. This semi-continuous or continuous mode allows to precisely control and adjust the deposition and the amounts of precursor material and fluid introduced for better control of the kinetics of formation and growth of the metal nitride on the surface of the sample.

According to another embodiment of the invention, each precursor material and the fluid are introduced into the second volume when a temperature and a pressure in the second volume are greater than or equal, respectively, to the critical temperature and pressure of the introduced fluid, no precursor material and fluid being introduced during the growth of the metal nitride on the surface of the sample.

This allows to carry out a deposition in closed mode.

According to a particular feature of the invention, the sample is made of steel or is a metal alloy or is a conductive ceramic or is a conductive polymer.

According to another particular feature of the invention, the precursor material is a titanium organometallic or a tantalum organometallic. The advantage of using these precursor materials is to form a titanium nitride or tantalum nitride coating on the sample. In addition, these precursor materials are not very dangerous and not very toxic for the operator.

According to another particular feature of the invention, the fluid introduced into the second volume comprises ammonia. Ammonia then serves both as a source of nitrogen and as a reducing agent for precursor materials comprising a precursor of titanium or tantalum.

According to another particular feature of the invention, a temperature of the internal walls is comprised between 90° C. and 200° C. during the formation and growth of the metal nitride on the surface of the sample.

According to another particular feature of the invention, the sample is heated so as to reach a temperature comprised between 100° C. and 800° C. during the formation and growth of the metal nitride on its surface.

According to another particular feature of the invention, in the second volume, a temperature is comprised between 90° C. and 800° C. and a pressure is comprised between 1 MPa and 25 MPa, for example between 10 MPa and 25 MPa during the formation and the growth of metal nitride on the surface of the sample.

According to another particular feature of the invention, a duration of the method is comprised between 1 min and 60 min.

According to another particular feature of the invention, the duration of the method is greater than 60 min. This allows to increase the thickness of the metal nitride formed on the surface of the sample.

BRIEF DESCRIPTION OF THE DRAWINGS

Other features and advantages of the present invention will emerge from the description given below, with reference to the appended drawings which illustrate examples of embodiments without any limiting character.

FIG. 1 shows, schematically and partially, a sectional view of a deposition device according to the invention.

FIG. 2 schematically shows the steps of a deposition method according to one embodiment of the invention.

FIG. 3 schematically shows the steps of a deposition method according to one embodiment of the invention.

DESCRIPTION OF EMBODIMENTS

Throughout the description, a supercritical fluid or a fluid under supercritical conditions is a fluid under pressure and at temperature under supercritical conditions.

FIG. 1 schematically and partially shows a sectional view of a device according to the invention.

The device 100 allows to deposit a metal nitride coating on a sample 104. The device 100 comprises a first enclosure 110 delimited by external walls 101 and forming a first closed volume V1. It also comprises a second enclosure 120 delimited by internal walls 102 forming a second closed volume V2. The second enclosure 120 is included in the first enclosure 110.

A heat transfer fluid is placed in the first volume V1 and thus circulates around the second enclosure 120.

The second enclosure 120 is adapted to receive a supercritical fluid and to withstand temperatures and pressures higher than the critical temperature and pressure of the supercritical fluid.

The device 100 also comprises an inlet 150 to be able to introduce into the second volume V2 a fluid which will be the supercritical fluid and therefore will be subjected to supercritical pressure and temperature conditions. It also comprises an inlet 151 to be able to introduce precursor materials into this same volume V2.

An outlet 152 is also present in the device 100 to purge the second volume V2, and thus allow continuous operation of the deposition device 100.

A sample holder 105 is placed in the second enclosure 120 to support the sample 104 on which the coating is deposited. Preferably, the sample holder 105 is placed in the second enclosure 120 so that the sample 104 is held at the center of the inductor forming the induction heater 103. Preferably, the sample holder 105 has a shape allowing to support the sample 104 with a minimum of point of contact in order to coat the largest possible surface of the sample with the metal nitride coating deposited and to limit the disturbances in the convection flow of the induction. Preferably, the sample holder 105 is composed of a material limiting thermal losses, it is for example composed of a thermally and electrically non-conductive material.

An induction heater 103 is placed in the first enclosure 110 and surrounds the second enclosure 120. The induction heating allows to heat the sample 104 by limiting the heating of the precursor materials present in the second volume V2.

In order not to disturb the heating of the sample 104 by induction, the internal walls 102 are transparent to electromagnetic radiation. They are for example made of ceramic. The ceramics used can be boron nitride, aluminum nitride, alumina or silicon nitride. These examples of dense and non-porous ceramics allow the internal walls 102 to have excellent mechanical strength and thus to withstand the pressures present in the second volume V2.

In order not to degrade the yield of the induction, the heat transfer fluid present in the first volume V1 is dielectric. For example, the heat transfer fluid can be a synthetic oil, air or even nitrogen.

According to a particular feature of the invention, O-rings 130, 131, 132 and 133 may be present at the ends of the two enclosures 110 and 120 in order to guarantee the tightness of the two enclosures 110, 120. These seals 130 to 132 are, for example, made of ethylene-propylene-diene monomer (EPDM) or of Kalrez 6375.

According to another particular feature of the invention, covers 140 and 141 can be present at the ends of the two enclosures 110 and 120 in order to close them.

Advantageously, only one of the two covers 140 and 141 is movable. The covers can for example be made of steel, and more particularly of 316L steel.

FIG. 2 represents the steps of a method for depositing a thick metal nitride coating according to one embodiment of the invention, in particular for depositing the coating in semi-continuous mode.

In a first step 201, the sample on which it is desired to form a metal nitride coating is placed in the second enclosure on the sample holder.

Then in the next step 202, the sample is heated by induction using the induction heating means. In this step, the second volume is also heated by means of the dielectric heat transfer fluid.

Then as soon as the temperature of the sample $T_{sam}$ reaches at least 100° C. and the temperature of the internal walls $T_{wall}$ reaches at least 70° C., the precursor materials and a fluid begin to be introduced into the second enclosure (step 203). The fluid introduced will then be subjected to supercritical conditions in the second enclosure.

During the introduction of the precursor materials and the fluid, the sample and the second volume continue to be heated by induction. This allows to reach in the vicinity of the sample the supercritical conditions necessary for the formation of the metal nitride on the surface of the sample of the introduced fluid.

The precursor materials and the introduced fluid therefore react under supercritical conditions to form, by chemical reaction of the seeds, metal nitride on the surface of the sample (step 204). Throughout the formation and growth of the metal nitride on the surface of the sample, the precursor materials and the fluid are introduced into the second enclosure. The formation of metal nitride on the surface of the sample thus takes place in semi-open or continuous mode. This allows the amounts of precursor materials and fluid to be adjusted as the metal nitride layer grows.

When the growth of the continuous layer of metal nitride is complete, that is to say when the thickness of metal nitride is reached, the second enclosure is cooled before depressurizing it (step 205).

FIG. 3 shows the steps of a method for depositing a thick metal nitride coating according to another embodiment of the invention, in particular for depositing the coating in closed mode.

In a first step 301, the sample on which it is desired to form a metal nitride coating is placed in the second enclosure on the sample holder.

Then in the next step 302, the sample is heated by induction using the induction heating means. In this step, the second volume is also heated by means of the dielectric heat transfer fluid.

As soon as the temperature and the pressure within the second enclosure $(T, P)_{2nd\ volume}$ reach at least the critical temperature and pressure $(T, P)_c$ of the fluid that is to be introduced, the precursor materials and the fluid which will thus be placed under supercritical conditions (step 303) are introduced in the second enclosure.

The precursor materials and the supercritical fluid will then react and form, by chemical reaction of seeds, metal nitride on the surface of the sample in order to form a continuous layer which will grow throughout the duration of the reaction. During this reaction step 304, no precursor material or fluid is added. The formation of metal nitride on the surface of the sample takes place in closed mode.

When the growth of the continuous layer of metal nitride is complete, that is to say when all the precursor materials have reacted, the second enclosure is cooled before depressurizing it (step 305).

Regardless of the embodiment, the sample can be made of steel, can be a metal alloy, or can be a conductive ceramic or a conductive polymer.

Regardless of the embodiment, the precursor material can be a halide or an organometallic. The precursor material may in particular be a titanium organometallic or a tantalum organometallic, for example tetrakis(dimethylamido) titanium TDMAT or tetrakis(diethylamido) titanium TDEAT. Thus, for example with a titanium organometallic as a precursor, a titanium nitride coating can be formed on the surface of the sample; or a tantalum nitride coating can be formed with a tantalum organometallic as the precursor material.

Regardless of the embodiment, the supercritical fluid, that is to say the fluid introduced into the second enclosure, may comprise ammonia, ethanol, methanol, carbon dioxide, dinitrogen, argon, alkanes, toluene or a mixture of these fluids. If the precursor material is TDMAT or TDEAT, ammonia will preferably be chosen as the supercritical fluid, because these precursors have good solubility in this medium and the reducing nature of ammonia allows to obtain the desired stoichiometry of the nitride.

In the case of the method described with reference to FIG. 3, if ammonia is chosen as the supercritical fluid, the precursor materials and the ammonia will be introduced into the second enclosure (step 303) when the temperature reaches at least 132.3° C. and the pressure 11.3 MPa, these thresholds corresponding to the critical temperature and pressure values of ammonia.

Regardless of the embodiment, the temperature of the internal walls can vary between 90° C. and 200° C. during the formation and growth of the metal nitride on the sample (step 204 or 304).

Regardless of the embodiment, the temperature of the sample can vary between 100° C. and 800° C. during the step 204 or 304.

Regardless of the embodiment, the temperature of the supercritical fluid, and therefore of the second volume, can vary in the vicinity of the sample between 90° C. and 800° C. during the step 204 or 304.

Regardless of the embodiment, the pressure in the second volume can vary between 1 MPa and 25 MPa, for example between 10 MPa and 25 MPa, during the step 204 or 304.

Regardless of the embodiment, the method of the invention can last between 1 min and 60 min, or even longer if necessary depending on the thickness of the desired metal nitride deposition.

Whether in semi-open or continuous mode (method described with reference to FIG. 2) or in closed mode (method described with reference to FIG. 3), the method according to the invention allows to obtain a continuous, dense and homogeneous metal nitride coating on the surface of the sample, the sample possibly having a complex three-dimensional geometry, that is to say non-planar.

The expression "comprised between . . . and . . . " must be understood as including the limits.

The invention claimed is:

1. A method for depositing a metal nitride with a thickness greater than or equal to 1 μm on a sample by supercritical fluids implemented by a device including
    a first enclosure delimited by external walls forming a first closed volume;
    a second enclosure delimited by internal walls forming a second closed volume, the second enclosure being placed in the first enclosure and being intended to contain a fluid under supercritical conditions and the material of the internal walls being transparent to electromagnetic radiation;
    a heat transfer dielectric fluid circulating in the first closed volume around the second enclosure;
    a sample holder present in the second closed volume and configured to support the sample;
    an induction heating device placed in the first enclosure and surrounding the second enclosure so as to be able to heat the sample placed on the sample holder;
    an inlet configured to introduce a fluid into the second closed volume;
    an inlet configured to introduce at least one precursor material into the second closed volume, and
    at least one outlet configured to purge the second closed volume,
the method comprising:
    placing the sample on the sample holder;
    heating the sample by induction and heating the second closed volume by the dielectric heat transfer fluid;
    introducing each precursor material and the fluid into the second closed volume so as to cause the precursor materials and the fluid to react under supercritical conditions to form metal nitride on a surface of the sample and to grow the metal nitride formed on the surface of the sample, and
    cooling then depressurizing the second closed volume.

2. The deposition method according to claim 1, wherein each precursor material and the fluid are introduced into the second closed volume when a temperature of the sample is greater than or equal to 100° C. and a temperature of the internal walls is greater than or equal to 70° C. throughout a duration of metal nitride formation and growth on the surface of the sample.

3. The deposition method according to claim 1, wherein each precursor material and the fluid are introduced into the second closed volume when a temperature and a pressure in the second closed volume are greater than or equal, respectively, to the critical temperature and pressure of the supercritical fluid, no precursor material and supercritical fluid being introduced during the growth of the metal nitride on the surface of the sample.

4. The deposition method according to claim 1, wherein the sample is made of steel or is a metal alloy or is a conductive ceramic or is a conductive polymer.

5. The deposition method according to claim 1, wherein the precursor material is a titanium organometallic or a tantalum organometallic.

6. The deposition method according to claim 1, wherein the fluid introduced into the second closed volume comprises ammonia.

7. The deposition method according to claim 1, wherein a temperature of the internal walls is comprised between 90° C. and 200° C. during the formation and growth of the metal nitride on the surface of the sample.

8. The deposition method according to claim 1, wherein the sample is heated so as to reach a temperature comprised between 100° C. and 800° C. during the formation and growth of the metal nitride on its surface.

9. The deposition method according to claim 1, wherein, in the second closed volume, a temperature is comprised between 90° C. and 800° C. and a pressure is comprised between 10 MPa and 25 MPa during the formation and growth of metal nitride on the surface of the sample.

10. The deposition method according to claim 1, wherein, in the second closed volume, a temperature is comprised between 90° C. and 800° C. and a pressure is comprised between 1 MPa and 25 MPa during the formation and growth of metal nitride on the surface of the sample.

11. The deposition method according to claim 1, wherein a duration of the method is comprised between 1 min and 60 min.

* * * * *